United States Patent [19]
Segnan

[11] Patent Number: 5,960,197
[45] Date of Patent: Sep. 28, 1999

[54] COMPILER DISPATCH FUNCTION FOR OBJECT-ORIENTED C

[75] Inventor: Marino Segnan, Palo Alto, Calif.

[73] Assignee: Sun Microsystems, Inc., Palo Alto, Calif.

[21] Appl. No.: 08/644,041

[22] Filed: May 9, 1996

[51] Int. Cl.⁶ .................................................. G06F 9/44
[52] U.S. Cl. ........................ 395/702; 395/705; 709/303
[58] Field of Search .................................. 395/701–703, 395/683, 680, 705; 709/300, 303

[56] References Cited

U.S. PATENT DOCUMENTS

| | | | |
|---|---|---|---|
| 5,421,016 | 5/1995 | Conner et al. ........................... | 395/700 |
| 5,515,536 | 5/1996 | Corbett et al. ........................... | 395/700 |
| 5,535,391 | 7/1996 | Hejlsberg et al. ....................... | 395/700 |
| 5,579,518 | 11/1996 | Yasumatsu ............................... | 395/705 |

OTHER PUBLICATIONS

Atkinson, "Hurricane: An Optimizing Compiler for Smalltalk," Conference Proceedings from Object–Oriented Programming Systems, Languages and Applications (OOPSLA) '86, Sep. 29–Oct. 2, 1986, Portland, Oregon, vol. 21, No. 11, pp. 151–158 (1986).

Baron et al., "MACH Kernel Interface Manual," Department of Computer Science, Carnegie–Mellon University, Pittsburgh, Pennsylvania, research sponsored by the Defense Advanced Research Projects Agency (DOD), ARPA Order No. 4864, monitored by the Space and Naval Warfare Systems Comand under contract N00039–84–C–0467, version of Aug. 23, 1990.

Chambers et al., "An Efficient Implementation of SELF, a Dynamically–Typed Object–Oriented Language Based on Prototypes," Conference Proceedings from OOPSLA '89, Oct. 1–6, 1989, New Orleans, Louisiana, vol. 24, No. 10, pp. 49–70 (1989).

Rose, "Fast Dispatch Mechanisms for Stock Hardware," Conference Proceedings from OOPSLA '88, Sep. 25–30, 1988, San Diego, California, vol. 23, No. 11, pp. 27–35 (1988).

Walmer et al., "A Programmer's Guide to the MACH System Calls," Department of Computer Science, Carnegie–Mellon University, Pittsburgh, Pennsylvania, version of Nov. 16, 1989.

Walmer et al., "A Programmer's Guide to the MACH User Environment," Department of Computer Science, Carnegie–Mellon University, Pittsburgh, Pennsylvania, version of Nov. 16, 1989.

Trehan et al., "Concurrent Object Oriented 'C'(COOC)", ACM Sigplan Notices, Feb. 1993, vol. 28, No. 2, pp. 45–52.

*Primary Examiner*—Robert W. Downs
*Assistant Examiner*—Kakali Chaki
*Attorney, Agent, or Firm*—Beyer & Weaver, LLP

[57] ABSTRACT

A compiler is described that generates instructions to execute object-oriented method call invocations in an efficient manner. Specifically, a method dispatch operation distinguishes between those method calls that do not require dynamic invocation from those that do, and optimizes the instructions generated to perform the former. For each object class declaration encountered during compilation, a dispatch array is created. Each dispatch array contains entries for all method calls which can be made to the class, including those implemented in an ancestor class(es), and all protocols adopted by these classes. As each method call is parsed during compilation, if the compiler finds an entry for the calling method in a dispatch table, an instruction to call a non-dynamic method dispatch function is generated. If, on the other hand, no entry for the calling method is found in a dispatch array, the compiler generates a conventional dynamic method dispatch instruction. The non-dynamic method dispatch function uses the dispatch array to directly identify the calling method's executable code segment. Use of non-dynamic method invocation can provide a substantial speed gain during program execution.

15 Claims, 6 Drawing Sheets

```
@interface A
- (void) x;
@end

@implementation A
- (void) x{ }
@end int main ( int i, char **j )
{
A *a;  // initialize object 'a'
by
[a x];  //any convenient
means
}
```

FIG. 2

```
@interface A
-(void) x;
@end

@interface B:A
-(void) y;
@end

@implementation B:A
-(void) y { }
@end int main ( int i, char **j )
{
B *b;  // initialize object 'b'
by
[b x];  // any convenient
means
[b y];
[b z];
}
```

FIG. 5

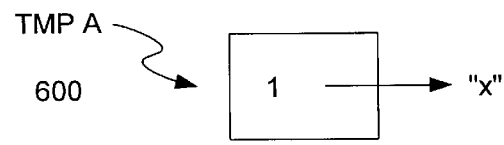
FIG. 6
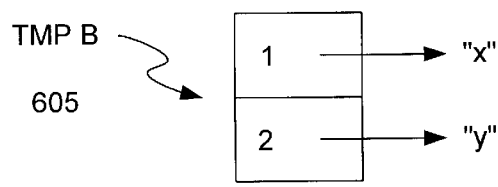
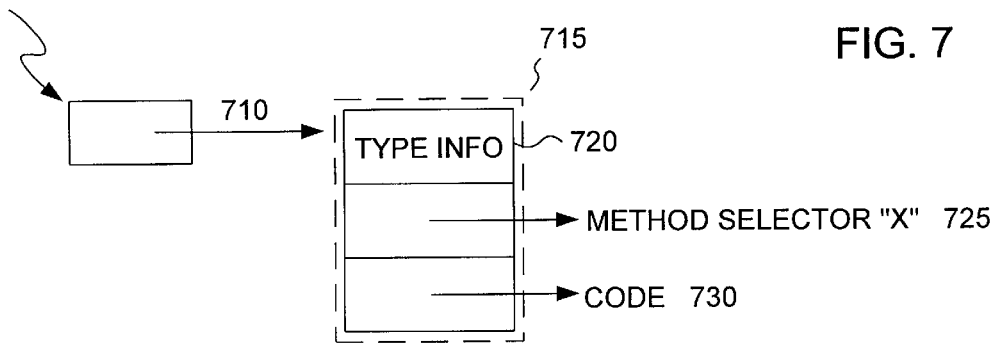
FIG. 7
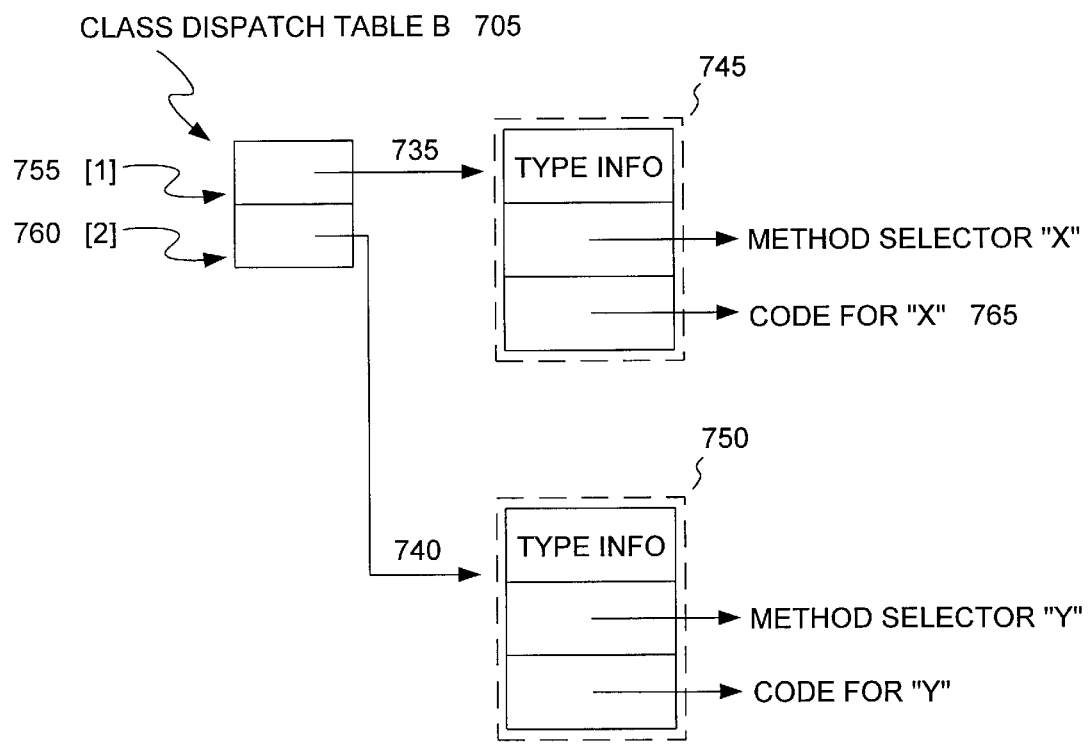

COMPILER DISPATCH FUNCTION FOR OBJECT-ORIENTED C

1. FIELD OF THE INVENTION

The invention relates in general to the field of software design and, more particularly, to a compiler for generating method invocation instructions for a computer program expressed in an object-oriented programming language. Specifically, a method dispatch operation distinguishes between those method calls that do not require dynamic invocation from those that do, and optimizes the instructions generated to perform the former.

2. BACKGROUND OF THE INVENTION

The term "method" has a commonly understood meaning within the field of object-oriented computer program development and another, albeit different meaning, in the field of patent law. To avoid confusion, the following description will use the term "method" as typically understood within the field of object-oriented computer programming. The term "process" will be used as an expression of a "method of doing something." That is, in the sense of performing a series of operations that comprise a patentable "process."

As shown in FIG. 1 a typical computer (or computer system) 100 is comprised of a processor 105 device, memory 110 (often referred to as random access memory or RAM), one or more long-term storage devices 115 (such as, for example, magnetic hard and floppy disks, magnetic tape units, and optical disk storage), a display unit 120, and an input device such as, for example, a keyboard 125. As would be known to those of ordinary skill, long-term storage devices 115 are used to store programs 130 that are loaded into memory 110 prior to the program's execution by the processor 105. One illustrative program 130 is a compiler program.

Consider the source-code program fragment in FIG. 2. During compilation, an object-oriented "OBJECTIVE-C" compiler creates a class data structure for each declared class, in this example class A. As shown in FIG. 3, a typical class data structure 300 contains a pointer to a method name list 305, a pointer to a class cache data structure 310, and other data 315 such as, for example, class ISA and superclass pointers, and other standard information. The method name list 305 is itself comprised of one or more elements (320 and 325), one for each method defined for the class, where each element comprises method and parameter typing information 330, a pointer to the method's name string or method selector 335, and a pointer to the method's executable code segment 340. The class data structure 300 contains all the information necessary for a compiler to generate a series of instructions to implement dynamic method invocation.

As would be known to those of ordinary skill in the art of object-oriented compiler design, class cache data structures, accessed via the class data structure's 300 class cache pointer 310, are used at program run-time to speed the execution of dynamic method invocation. Class cache data structures are updated during program execution.

Referring again to the source-code fragment shown in FIG. 2, when the compiler parses the method call [a x], it generates executable instructions to perform the following operations:

Step 1: Load a pointer to the instance of the object 'a' into a first specified register of the processor executing the program (the value 'a' represents an object type identifier).

Step 2: Load a pointer to the method name string "x" into a second specified register.

Step 3: Generate an instruction to call the standard MessageSend dispatch function. As would be known to those of ordinary skill, the MessageSend function is responsible, at program execution time, for locating the executable code segment 340 associated with the method being called. (The pointer value loaded in step 1 is MessageSend's first parameter and the pointer value loaded in step 2 is MessageSend's second parameter.)

At program run-time, a copy of the executable file (comprised of linked object-code modules) is loaded into memory 110 and a string unification operation is performed to resolve/unify multiple pointers to common method name strings. (This is important when an executable file is comprised of multiple object code modules.) Following initialization, instructions generated by the compiler are processed/executed by the processor 105.

When the instruction to call the MessageSend dispatch function (described above in step 3) is executed, the following sequence of steps are performed:

Step 3a: Load the address of the class data structure associated with the instance whose address is in the first specified register; the address of class A's class data structure 300. (By convention, if the value in the first specified register is nil MessageSend returns nil and the following operations are not performed.)

Step 3b: Load the address of the class cache associated with the class data structure; the address of class A's class cache 310.

Step 3c: Search the class cache identified in step 3b for the method name string whose address is loaded in the second specified register (see step 2 above). If a match between the method name string and an entry in the class cache is not found, the current class's class data structure is searched and then the current class's parent class data structure is searched. Each class data structure in a method call's inheritance chain is searched as needed in this manner. If no match is found, a run-time error is generated. If a match is found, the current class cache data structure is updated and processing continues to step 3d.

Step 3d: Jump to the executable code segment found in step 3c.

As described above the MessageSend, or a functionally equivalent dispatch function, treats all method call operations as dynamic invocations. That is, the address of the target executable code (for example, the code to implement method 'x') is computed at run-time through a general search procedure. Even though class caches (typically implemented as hash tables) are used to speed this operation, conventional MessageSend functions require a number of pointer/address comparisons and searches through, possibly, a number of different class data structures.

While dynamic method invocation provides a flexibility not found in many programming languages, the time required to provide this capability can be a significant factor in degrading a program's run-time performance. This is because, in practice, only a fraction of a program's method calls actually need to be treated in a dynamic manner. The invention is directed at a method dispatch technique which can improve a program's run-time performance by avoiding dynamic method invocation in those instances where it is not needed. While not limiting, the inventive technique is particularly useful at improving the run-time characteristics of a source-code program compiled using any one of the currently available "OBJECTIVE-C" compilers.

3. SUMMARY OF THE INVENTION

A compiler for generating method invocation instructions from a source-code program expressed in an object-oriented computer programming language such as, for example, "OBJECTIVE-C," is described. Specifically, a method dispatch operation distinguishes between those method calls that do not require dynamic invocation from those that do, and optimizes the instructions generated to perform the former. For those method calls that require dynamic invocation, no degradation in performance over that of existing compilers is incurred.

For each object-class declaration in a source-code program encountered during compilation, the compiler creates a dispatch array. Dispatch arrays contain entries for all method calls which can be made to an object of the declared object class. Thus, a dispatch array for a class sampleClass, for example, will contain entries for all methods explicitly defined for the class object sampleClass, and those methods defined in each of sampleClasses' ancestor classes.

As each source-code method call is parsed during compilation, the compiler attempts to find the object's method selector (i.e., method name string) in the appropriate dispatch array. If the selector is found, the compiler generates an instruction to call a new method dispatch function, hereinafter referred to as NewMessageSend. If, on the other hand, the method selector is not found in a dispatch array, the compiler generates a conventional (dynamic invocation) MessageSend dispatch instruction. NewMessageSend uses a dispatch array to directly identify the calling method's executable code segment. Since knowledge of a method's executable code is known at compile time for a majority of method calls in a typical computer program, method invocation in accordance with the invention can provide a substantial speed gain during program execution.

4. BRIEF DESCRIPTION OF DRAWINGS

FIG. 2 shows a sample code fragment.

FIG. 5 shows another sample code fragment.

FIG. 6 is an illustrative temporary data structure used by a compiler in accordance with the invention during an initial class method recognition operation.

FIG. 7 shows a class dispatch table in accordance with the invention for the code fragment of FIG. 5.

5. DETAILED DESCRIPTION OF A SPECIFIC EMBODIMENT

A compiler in accordance with the invention is described below. Those of ordinary skill in the field of object-oriented compiler design will recognize that the term "compiler" refers to a computer program that converts a series of instructions expressed in a human-oriented source language (such as, for example, "OBJECTIVE-C") to a functionally equivalent series of instructions expressed in a hardware-oriented target language, referred to as object code. In the interest of clarity, not all features of an actual implementation are described in this specification. It will of course be appreciated that in the development of any actual implementation (as in any software development project), numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking of software engineering for those of ordinary skill in the field of object-oriented compiler design having the benefit of this disclosure.

Figure 4:
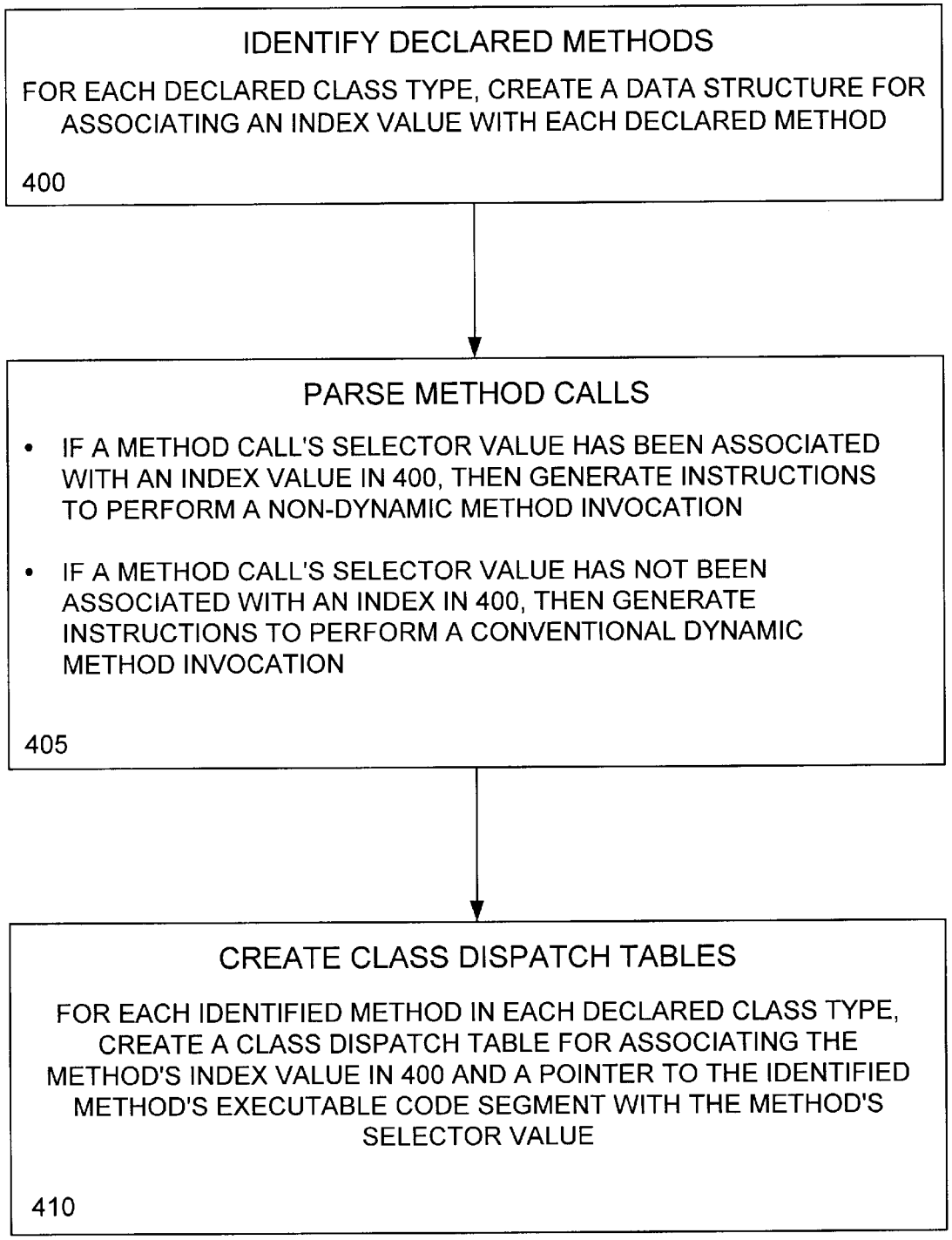
FIG. 4 shows, in flow chart form, a method for generating non-dynamic and dynamic method call instructions during program compilation.

As outlined in FIG. 4, a compiler in accordance with the invention, in addition to performing all of a compiler's conventional operations such as, for example, generating class data structures, identifies each declared method 400, parses each method call using a non-dynamic invocation technique for those methods previously declared 405, and creates a class dispatch table for each declared class type 410. Each of these operations are discussed below in the context of the source-code fragment shown in FIG. 5.

5.1 Operation One
Identification of Declared Methods

A compiler in accordance with the invention creates in memory, for each object class, a temporary array of selectors (pointers to method name strings) to which an instance of the class can respond and which are declared in the interface of the class or in the interface of the class's parent class. FIG. 6 shows illustrative temporary data arrays for the source-code fragment of FIG. 5.

In one embodiment, structures for both class A and class B are implemented as simple arrays so that a unique index is associated with each entry. For instance, temporary data structure TMP A 600 (for object class A) contains a pointer to method selector "x" and is associated with index value '1.' Temporary data structure TMP B's 605 (for object class B) contains pointers to method selectors "x" and "y" and are associated with indices '1' and '2' respectively. Alternatively, temporary data structures TMP A 600 and TMP B 605 could be implemented as hash tables, linked lists, or any other structure that provides a means of associating a unique identifier or index with each method selector. Note that no entry was created for method selector 'z' because no declaration for it was found in the program's source code (see FIG. 5).

5.2 Operation Two
Method Call Parsing Operations

For those method calls directed to methods (i.e., using method selectors) that are indexed as described above, dynamic invocation can be avoided. For instance, when a compiler in accordance with the invention parses the method call [b x] (see FIG. 5), it generates executable code to perform the following operations:

Step 1: Load a pointer to the instance of the class identified by 'b' into a first specified register of the processor executing the program.

Step 2: Load the index associated with object b's method selector, '1,' into a second specified register.

Step 3: Generate a call to a modified dispatch function, hereinafter referred to as NewMessageSend. (The pointer value loaded in step 1 is NewMessageSend's first parameter and the pointer value loaded in step 2 is MessageSend's second parameter.)

A similar sequence of instructions are generated when the compiler parses the method call [b y] in FIG. 5. In this case, however, step 2 results in an instruction which loads the index '2' into the second specified register.

When the compiler parses the method call [b z], however, there is no index associated with method selector 'z;' method 'z' has not been declared in class B or any of class B's parent classes. Thus, dynamic invocation is required and the [b z] is processed in a conventional manner using the standard MessageSend dispatch function. (See discussion in background.)

5.3 Operation Three
Creation of Class Dispatch Tables

Figure 1:
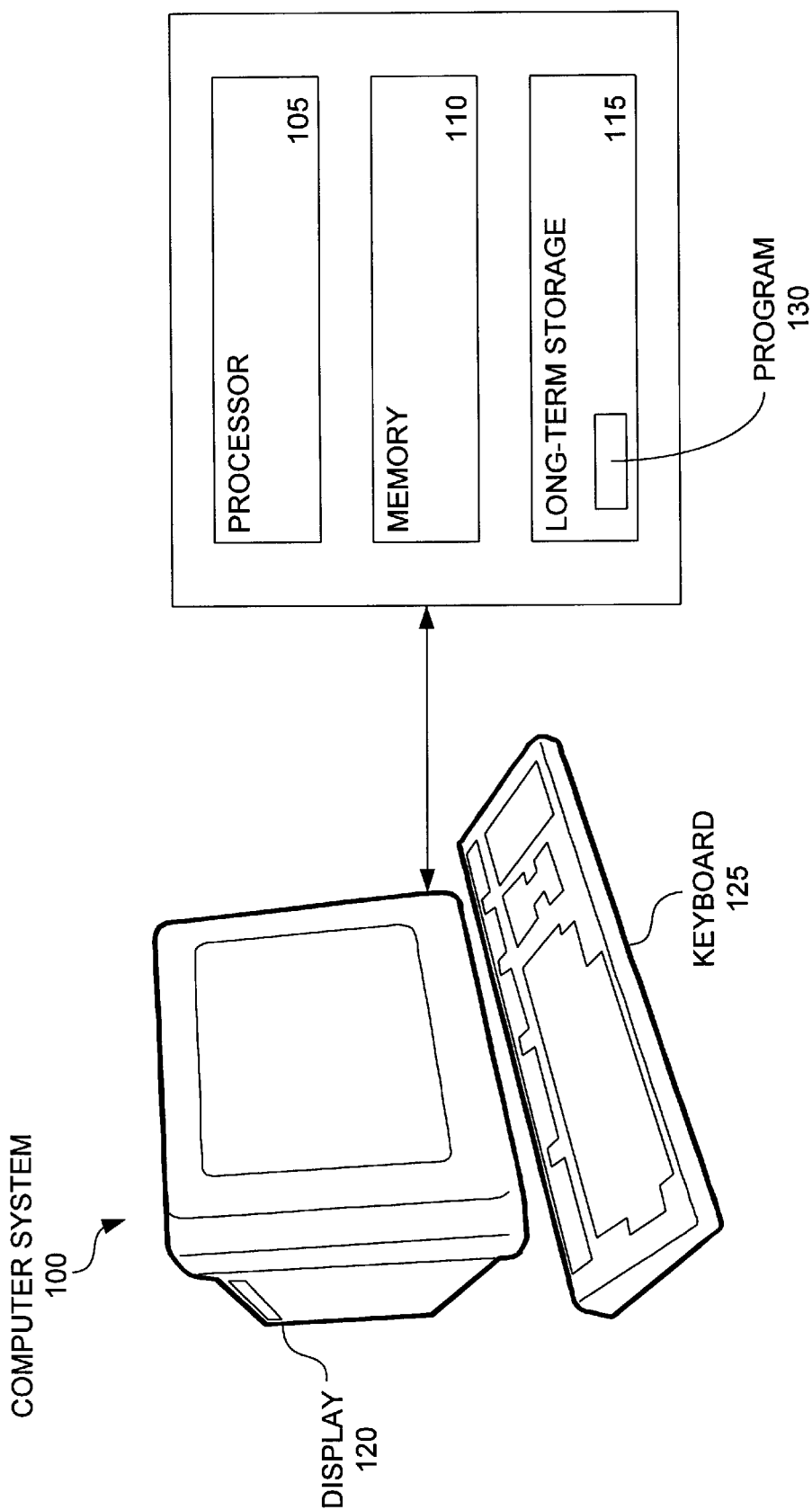
FIG. 1 shows, in block diagram form, a typical computer system.
Figure 3:
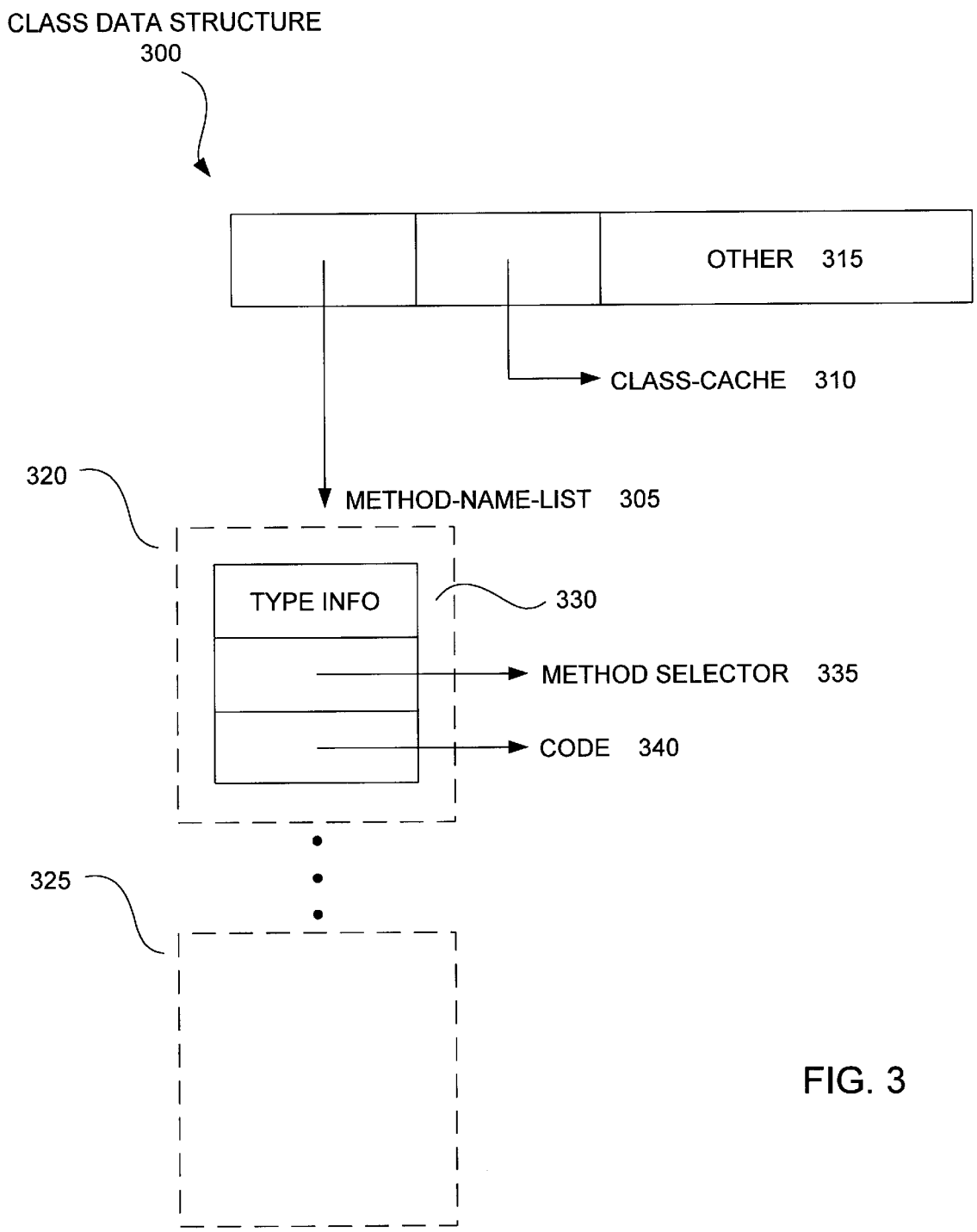
FIG. 3 is an illustrative class data structure used by conventional object-oriented compilers.

For each class identified in step 1 above, a class dispatch table is created by the compiler. See FIG. 7. Each class dispatch table (700 and 705) contains one entry for each method identified/indexed in the temporary data structures 600 and 605. Each class dispatch table entry contains a pointer to the identified method's entry in its class data structure's method name list. For example, class dispatch table A 700 has a single entry 710 pointing to method x's entry 715 in class A's method name list. The method name list entry, in turn, comprises method x's typing information 720, a pointer to method x's method name string or selector 725, and a pointer to method x's executable code segment 730. Similarly, class dispatch table B 705 comprises to entries 735 and 740. The first element 735 points to method "x's" entry 745 in class B's method name list. The second element 740 points to method y's entry 750 in class B's method name list. (See the earlier description of a class data structure and FIG. 3.) The compiler generates each class dispatch table in the compilation module where the class's @implementation definition is found.

Following creation of the class dispatch tables, each class data structure created during compilation (see discussion above) is augmented to contain a pointer to its associated class dispatch table. For example, the class data structure for class A would have added to it a pointer to class A's class dispatch table 700; the class data structure for class B would have added to it a pointer to class B's class dispatch table 705.

In one embodiment, class dispatch tables are implemented as simple arrays so that a unique integer index is associated with each entry. Alternatively, class dispatch tables (e.g., class dispatch table A 700 and class dispatch table B 705) may be implemented as hash tables, linked lists, or any other structure that provides a means of associating a unique identifier with each entry. For example, if simple arrays are used then the value of class dispatch table B[1] 755 is a pointer to the entry for method "x" and the value of class dispatch table B[2] 760 is a pointer to the entry for method "y."

5.4 Non-Dynamic Method Dispatch Function NewMessageSend

Figure 8:
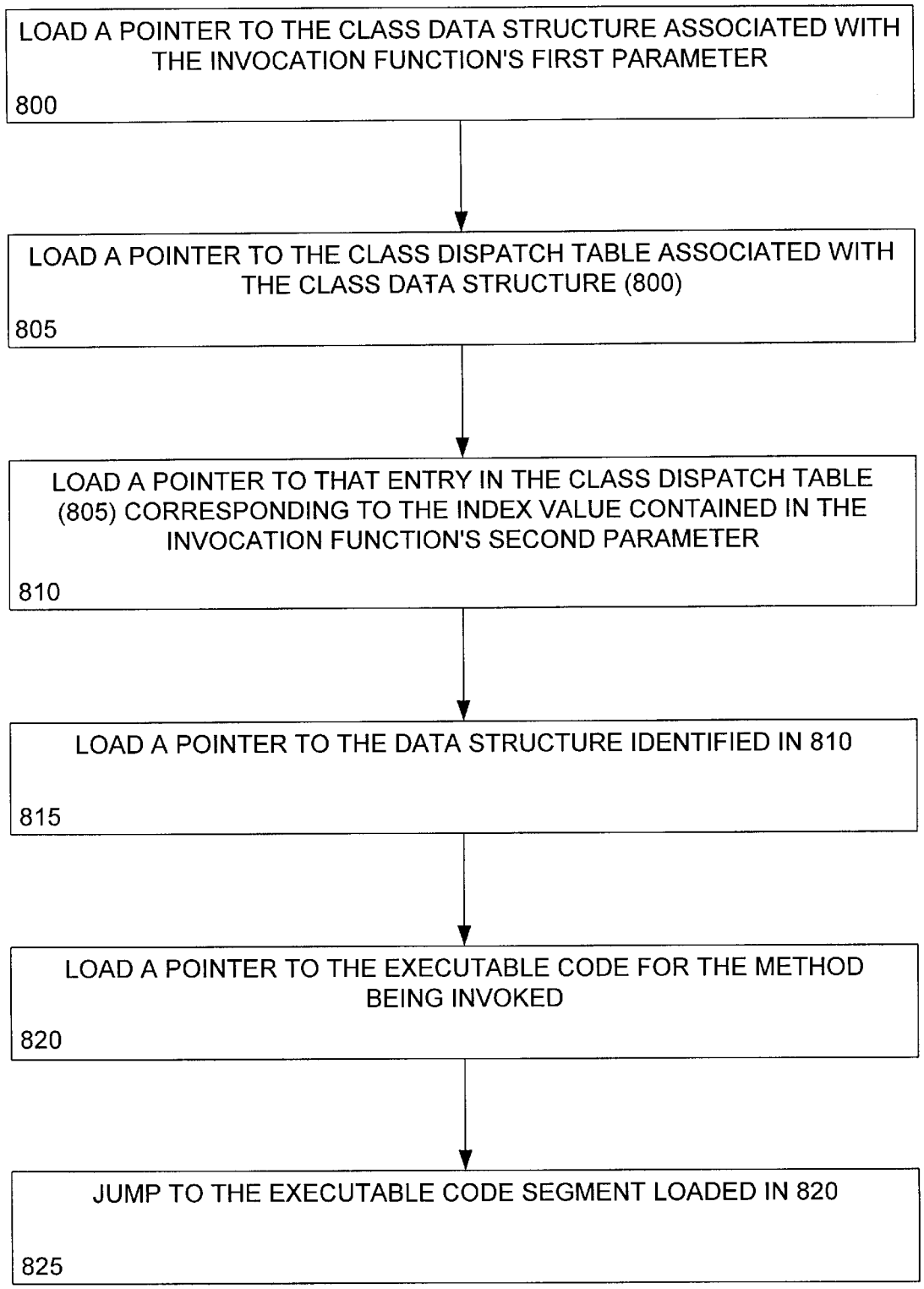
FIG. 8 shows, in flow chart form, a method dispatch function for generating non-dynamic method call instructions.

The method dispatch function NewMessageSend implements non-dynamic method invocation in accordance with the invention. When NewMessageSend is executed at program run-time, the following sequence of steps are performed (see FIG. 8):

Step 3a: Load a pointer to the class data structure associated with the instance whose address is in the first specified register 800. (For compatibility with existing compilers, if the value in the first specified register is nil, NewMessageSend returns nil and the following operations are not performed.)

Step 3b: Load a pointer to the class dispatch table (via the class data structure) 805.

Step 3c: Load a pointer to that entry in the class dispatch table corresponding to the index value contained in NewMessageSend's second parameter 810, i.e., use the index value contained in the second specified register as an offset value into the class dispatch table address loaded in step 3b.

Step 3d: Load a pointer to the method's data structure identified in step 3c 815, i.e., a pointer to the method's entry in its class data structure's method name list.

Step 3e: Load the address of the executable code for the method being invoked 820, i.e., via the address identified in step 3d.

Step 3f: Jump to the executable code segment identified in step 3e 825.

Referring again to the source-code fragment given in FIG. 5 and FIG. 7, consider the execution of NewMessageSend in the context of the method call [b x]. Recall that, prior to executing a jump to NewMessageSend, a pointer to object 'b' has been loaded into a first specified register (step 1 above), and the index corresponding to the called method 'x,' in this case '1,' has been loaded into a second specified register (step 2 above).

Step 3a'. Load a pointer to the class data structure for class B; i.e., the class of which object 'b' is an instance.

Step 3b'. Load, via the class data structure, a pointer to class dispatch table B 705. Step 3c'. Load a-pointer to class dispatch table B[1] 755.

Step 3d'. Load a pointer to method x's method name list entry 745.

Step 3e': Load the address of method x's executable code segment 765. It is noted that if method x's executable code 765 is the first field in the entry 745, then step 3e' is unnecessary because the offset is zero.

Step 3f': Jump to the executable code segment identified in step 3e'.

5.5 Comments

In those instances where a method's executable code is defined at compile time, it is possible for a compiler to use a direct method invocation process. When this is possible, a method dispatch technique in accordance with the invention eliminates the need for costly (time consuming) address comparison operations and searches through one or more class (or similar) cache data structures. Since this information is known at compile time for a majority of method calls in a typical object-oriented program (e.g., source-code), use of a direct dispatch technique can provide a substantial speed gain during program execution. On the other hand, if a method's executable code segment is undefined at compilation time, no degradation in performance over existing (dynamic) method dispatch techniques is incurred.

It will be recognized by those of ordinary skill in the art of object-oriented compiler design having the benefit of this disclosure, that the means for performing compilation or executing a non-dynamic method dispatch function in accordance with the invention is through the execution of one or more computer instructions. It will further be appreciated and understood that the above described techniques to provide a compiler application with the ability to generate both dynamic and non-dynamic method invocation instructions is broadly applicable and is not limited strictly to a compiler for the "OBJECTIVE-C" language.

It will further be appreciated by those of ordinary skill having the benefit of this disclosure that numerous variations from the foregoing description are possible without departing from the inventive concept described herein. For instance, a linker could be modified to process class dispatch tables. A run-time loader could also be modified to resolve and/or unify, at program initialization time, class dispatch tables created in different compile modules. Accordingly, it is the claims set forth below, and not merely the foregoing illustration, which are intended to define the exclusive rights claimed in this invention.

5.6 Program Storage Device

The foregoing techniques may be implemented by programming a suitable general-purpose computer. The programming may be accomplished through the use of a program storage device (e.g., 115) readable by the computer and encoding a program of instructions executable by the computer for performing the operations described above. The program storage device may take the form of, for example, one or more floppy disks; a CD ROM or other optical disk; a magnetic tape; a read-only memory chip (ROM); and other forms of the kind well-known in the art or subsequently developed. The program of instructions may be "object code," i.e., in binary form that is executable more-or-less directly by the computer; in "source code" that requires compilation or interpretation before execution; or in some intermediate form such as partially compiled code and/or a collection of executable library files. The precise forms of the program storage device and of the encoding of instructions is immaterial here.

What is claimed is:

1. A process executed by a computer system for compiling an object-oriented computer program into a compiled program, said object-oriented computer program having a plurality of declared object classes and a plurality of method call instructions, each of said plurality of method call instructions having an object type identifier and a method selector, said process comprising:
    (a) generating for each declared object class a first data structure, said first data structure having one element for each defined method for said declared object class, said element comprising a pointer to a method selector for said defined method and an index value;
    (b) generating for each method call instruction an instruction to store a pointer to said object type identifier in a specified first register of said computer system; and
    (c) testing whether a method identifier is an element of one of said first data structures and
        (i) if so, generating an instruction to store the index associated with said method identifier in a second specified register and then generating an instruction to jump to a non-dynamic method dispatch function,
        (ii) else generating an instruction to store a pointer to said method identifier in said second specified register and then generating an instruction to jump to a dynamic method dispatch function.

2. The process of claim 1, wherein said non-dynamic method dispatch function uses the index value stored in said second specified register to locate an executable code segment associated with the pointer stored in said specified first register.

3. A program storage device that is readable by a computer system, said program storage device having encoded therein a program of instructions that includes instructions for executing the process described in claim 2.

4. A computer system comprising a compiler program for performing the operations described in claim 2.

5. A program storage device that is readable by a computer system, said program storage device having encoded therein a program of instructions that includes instructions for executing the process described in claim 1, 2, or 7.

6. A computer system comprising a compiler program for performing the operations described in claim 1.

7. A computer-executed non-dynamic dispatch function process for evaluating a method call instruction expressed in the programming language OBJECTIVE-C, said method call instruction having an object class identifier, a method selector, and an executable code segment, said object class identifier belonging to an object class, said object class having a class data structure and a class dispatch table, said class dispatch table having an index value associated with said method selector, said non-dynamic dispatch function process comprising:
    loading a pointer to said class data structure;
    loading a pointer to said class dispatch table wherein the pointer to the class dispatch table is arranged to be loaded using the class data structure;
    loading a pointer to an entry in said class dispatch table corresponding to said index value;
    loading a pointer to said executable code segment associated with said pointer loaded to said entry in said class dispatch table corresponding to said index value; and
    jumping to said executable code segment.

8. A program storage device that is readable by a computer system, said program storage device having encoded therein a program of instructions that includes instructions for executing the process described in claim 7.

9. A computer system comprising a compiler program for performing the operations described in claim 7.

10. A computer-executed non-dynamic dispatch function process as recited in claim 7 further including loading a pointer to a method data structure associated with said entry in said class dispatch table corresponding to said index value.

11. A computer-executed non-dynamic dispatch function process as recited in claim 10 wherein loading a pointer to said executable code segment with said pointer loaded to said entry in said class dispatch table corresponding to said index value includes using the pointer to the method data structure associated with said entry in said class dispatch table corresponding to said index value.

12. A memory for storing data for access by a compiler program being executed on a computer system, the memory comprising:
    a data structure stored in said memory, said data structure used by said compiler program for processing a method call to a specified object class, said data structure including at least one entry having
        an index value,
        a pointer to a method identifier associated with said specified object class, said method identifier being arranged to identify a method associated with said specified object class, and
        a pointer to an executable code segment associated with said identified method.

13. The memory of claim 12 wherein said method identifier is a method name string.

14. A computer program product arranged to cause a computer system to compile an object-based computer program into a compiled program, the object-based computer program having at least one declared object class and at least one method call instruction, the at least one method call instruction having an object type identifier and a method selector, the computer program product comprising:

computer code for generating a first data structure for the at least one declared object class, the first data structure having an element for each defined method for the at least one declared object class, the element including a pointer to a method selector for the defined method and an index value;

computer code for generating an instruction to store a pointer to the object type identifier for the at least one method call instruction in a specified first register of the computer system;

computer code for determining whether a method identifier is an element of the first data structure; and a computer-readable medium that stores the computer codes.

15. A computer program product according to claim 14, the computer program product further including:

computer code for generating an instruction to store the index associated with the method identifier in a specified second register and for generating an instruction to jump to a non-dynamic method dispatch function when it is determined that the method identifier is an element of the first data structure; and computer code for generating an instruction to store a pointer to the method identifier in the specified second register and for generating an instruction to jump to a dynamic method dispatch function when it is determined that the method identifier is not an element in the first data structure.

* * * * *